United States Patent [19]

Verboom

[11] Patent Number: 4,866,686
[45] Date of Patent: Sep. 12, 1989

[54] OPTICAL RECORD CARRIER AND APPARATUS FOR READING THE RECORD CARRIER

[75] Inventor: Johannes J. Verboom, Eindhoven, Netherlands

[73] Assignee: Optical Storage International-Holland, Eindhoven, Netherlands

[21] Appl. No.: 1,293

[22] Filed: Jan. 7, 1987

[30] Foreign Application Priority Data

Apr. 14, 1986 [NL] Netherlands ............................ 8600934

[51] Int. Cl.⁴ ............................................. G11B 17/22
[52] U.S. Cl. .......................................... 369/32; 369/46; 369/59; 369/275
[58] Field of Search ....................... 369/32, 46, 59, 275

[56] References Cited

U.S. PATENT DOCUMENTS

| | | | |
|---|---|---|---|
| 4,535,439 | 8/1985 | Satoh et al. | 369/44 X |
| 4,564,929 | 1/1986 | Yonezawa et al. | 369/44 |
| 4,587,648 | 5/1986 | Ando | 369/275 |
| 4,669,077 | 5/1987 | Gerard et al. | 369/46 X |
| 4,751,695 | 6/1988 | Kaku et al. | 369/46 |

Primary Examiner—Patrick R. Salce
Assistant Examiner—Anita M. Ault
Attorney, Agent, or Firm—Algy Tamoshunas; Leroy Eason

[57] ABSTRACT

The recording surface of an optical record carrier (1) is divided into a succession of first (A) and second (B) annular zones, each including a plurality of substantially concentric information tracks. The tracks in each zone (A) include radially aligned first control words (13) and the tracks in the annular zones (B) include radially aligned second control words (14), the structures of the first and second control words being distinguishable from each other. An optical scanning device projects a beam which as it scans the tracks reads the control words and a detection circuit generates a measurement signal $V_m$ upon each passage of the beam from one zone to another. The measurement signal can be utilized to rapidly address the scanning beam to any of the annular zones.

7 Claims, 4 Drawing Sheets

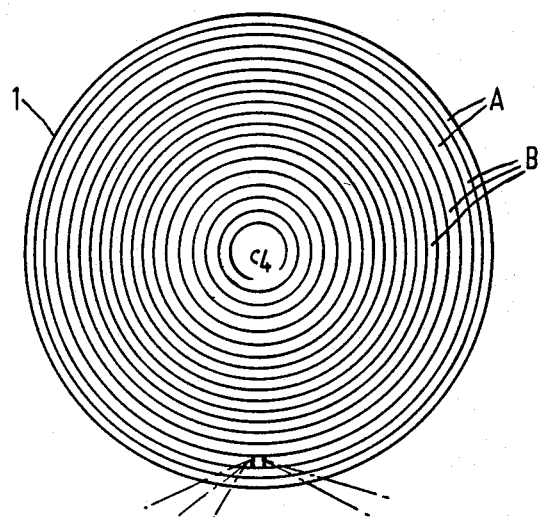
FIG. 1a
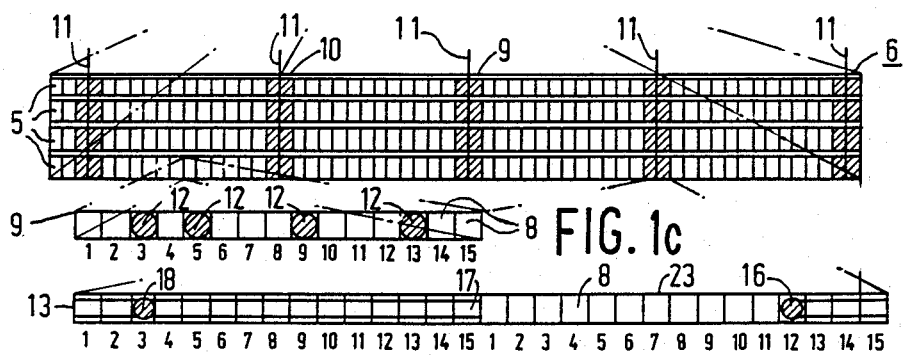
FIG. 1b
FIG. 1c
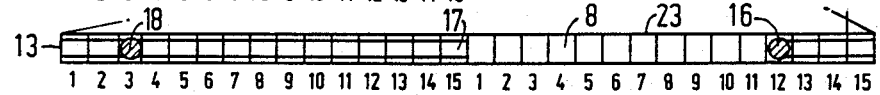
FIG. 1d
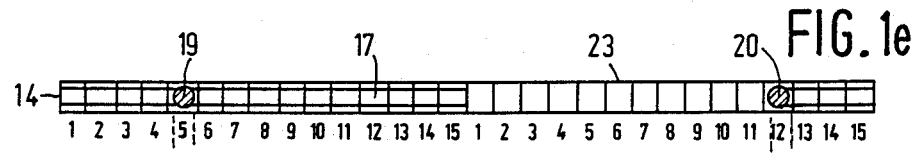
FIG. 1e
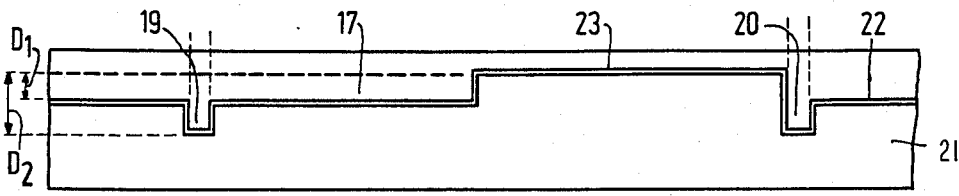
FIG. 1f

OPTICAL RECORD CARRIER AND APPARATUS FOR READING THE RECORD CARRIER

BACKGROUND OF THE INVENTION

1. Field of the Invention

The invention relates to an optical record carrier which having an information structure arranged along tracks, which tracks are situated substantially concentrically around a centre of rotation, the the tracks having a successin of first and second annular zones which can be distinguished from each other and which are situated concentrically around the center of rotation.

The invention also relates to an apparatus for reading such a record carrier, which apparatus comprises drive means for rotating the information carrier about the centre of rotation, a radiation source producing a read beam, an objective system for focussing the read beam to form a scanning spot on the record carrier and subsequently directing the read beam to a radiation-sensitive detection system, the scanning spot being radially movable in the plane of rotation of the record carrier under control of a radial actuating device, and the detection system for reading the information structure converting the modulation of the read beam produced by the structure on the record carrier into an electric signal.

2. Description of the Related Art

Such a record carrier and apparatus are known from published Netherlands Patent Application No. 7510035 (PHN 8118), which correspond to pending U.S. application Ser. No. 128,417, filed Mar. 10, 1980. In the known record carrier the first zones differe from the second zones in that the track spacing in the first zones differs from that in the second zones. The known apparatus comprises an auxiliary radiation source for producing an additional address beam which projects an address spot on the record carrier, which spot covers a plurality of adjacent tracks. When the address spot and a scanning spot which is which is locked to the address beam move in a radial direction in such a way that they pass a number of annular zones, the different track spacings cause a reflected first-order diffraction sub-beam of the additional address beam to move to and fro over associated detectors. This to-and-fro movement is detected to provide a counting signal which indicates how many annular zones have been traversed by the address spot. This enables a specific area to be addressed rapidly and correctly, resulting in very fast access time to locate an arbitrary track.

However, the known record carrier has the disadvantage that an additional auxiliary radiation source is necessary for addressing the areas. Moreover, the varying track spacing complicates the manufacture of the record carriers. In addition, in the case of a blank still uninscribed record carrier without performed grooves addressing is impossible owing to the absence of tracks.

SUMMARY OF THE INVENTION

It is the object of the present invention to provide means enabling a rapid addressing of the annular zones in such a way that the aforementioned drawbacks are mitigated.

In accordance with a first aspect of the invention a record carrier of the type defined in the opening paragraph is characterized in that the record carrier is provided with first and second control structures which can be distinguished from each other and from the information structure, the first zones being provided with groups of radially aligned first control structures and the second zones being provided with radially aligned second control structures in order to distinguish between the first zones and the second zones.

In accordance with a second aspect of the invention an apparatus of the type defined in the foregoing is characterized in that the apparatus comprises a detection circuit for deriving a measurement signal from first and second components of the electric signal corresponding to the modulated radiation beam as it scans the first and the second control structures respectively, which measurement signal indicates the passage of a boundary between the first and the second zones during a radial movement of the scanning spot.

This enables the scanning spot to be moved over the record carrier along a path which in each of the annular zones being passed intersects at least one group of control structures. As the control structures are scanned by the scanning spot an electric signal is generated which differs from the electric signals generated during scanning of the information structures. Since the control structures are radially aligned with each other the angle at which the scanning spot intersects the group of control structures hardly affects the waveform of the electric signal generated during scanning of the control structures, enabling a reliable detection signal suitable for controlling the addressing of the annular zones to be derived from the electric signal.

In one embodiment the record carrier is characterized in that the control structures are arranged along the substantially concentric tracks in such a way that along the tracks the structure alternately comprises control structures and information structures. This embodiment has the advantage that during manufacture of the disc the control structure can be formed simply at the same time as the informatin structure.

In another embodiment the record carrier is characterized in that over the entire width of the annular zones the control structures are situated at locations which are defined by radii issuing from the center of rotation and having equal angular spacings. This record carrier has the advantage that during each radial displacement of the scanning spot, the disc being rotated through an angle larger than the angle between two radii during the time in which the scanning spot passes an annular zone, the scanning spot always describes such a path that it intersects at least one group of adjacent control structues in each annular zone.

In a further embodiment the record carrier is characterized in that the first and the second control structures differ from each other in that first and second detectable areas are displaced by a first and a second predetermined angle respectively relative to the radii, the first detectable areas in the first control structures producing a first modulation and the secnd detectable areas in said first control structures producing a different second modulation of the read beam and said areas in the second control structues producing said second modulation and said first modulation of the read beam respectively. This embodiment has the advantage that the first and the second control structures can be distinguished from one another by differential detection, for which the modulations produced by the first and the second areas are compared with each other, so that the correct distinction between the first and the second control structures is substantially independent of variations in read-bema intensity.

An apparatus which distinguishes between the control structure by means of differential detection is characterized in that the apparatus comprises a synchronizing circuit for deriving from the electric scanning signal first and second control signals which are synchronous with the incidence of the scanning spot on the first and the second detectable areas respectively. A sample-and-hold circuit derives first and second samples of the electric signal in response to the first and second control signals, and a comparator circuit compares the first and the second samples with each other and generates the measurement signal depending on the result of the comparison.

BRIEF DESCRIPTION OF THE DRAWINGS

Embodiments of the invention will now be described in more detail, by way of example, with reference to FIGS. 1 to 7, in which FIGS. 1a thru 1f show a record carrier in accordance with the invention, FIG. 2 schematically ilustrates the mechanical construction of the scanning device for reading a record carrier in accordance with the invention.

DESCRIPTION OF THE PREFERRED EMBODIMENTS

Figure 2:
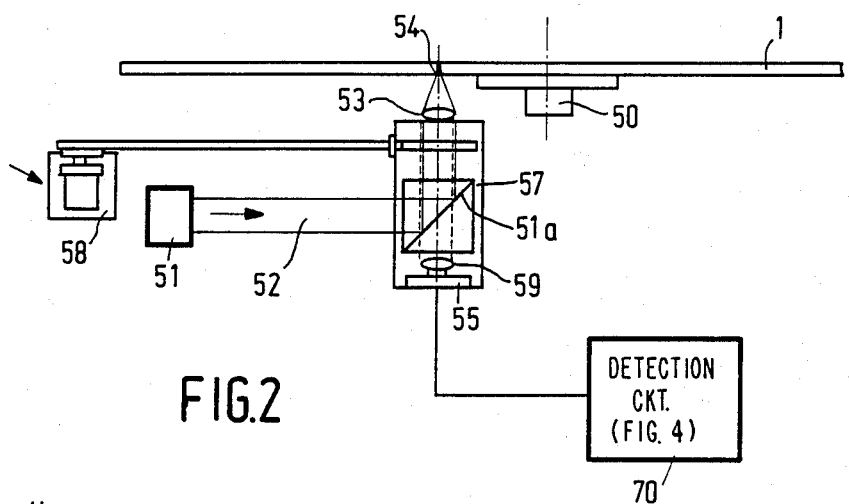

FIG. 1 shows a record carrier 1 in accordance with the invention, which is divided into first annular zones A and second annular zones B which alernate with one another and which are situated concentrically around a centre of rotation 4. Each annular zone comprises a plurality of tracks, for example sixteen, which are situated concentrically or spirally around the center of rotation 4, along which tracks an optically readable structure is arranged. A portion 6 of such a zone of the record carrier 1 is shown to a highly enlarged scale, in which portion 6 there are four tracks which bear the reference numeral 5. Each track is divided into sucessive groups (9, 10), each such group comprising fifteen elementary area bits 8 which all extend over an equal number of radii (which groups of elementary areas will be referred to hereinafter as "bytes"). The sequence numbers "1" to "15" of the bit positions within the bytes are also indicated in FIG. 1. There are both information bytes 9 and control bytes 10, the control bytes being shown as hatched portions. The control bytes 10 are at locations which are defined by a group of radii 11 which issue from the centre of rotation 4 and which have equal angular spacing, so that the control bytes of each pair of adjacent tracks will be radially aligned with each other. (Hereinafter each pair of radially aligned control bytes of adjacent tracks will be referred to more briefly as "control words"). The bits of the information bytes 9 have an optically readable structure of the customary type, a plurality of such bits being a pit 12 having a reflectivity which is lower than that of the adjacent lands. For information bytes it is conventional that only a limited number of possible distributions of pits 12 over the elementary bit positions 8 are permissible. In the present example only those distributions are permissible in which four pits are distributed over the fifteen available elementary bit positions 8 of each of the information bytes 9.

The control words 13 in the annular zones A are provided with a bit structure which differs from the permissible bit structure of information bytes in regard to the distribution of the number of pits over the available bit positions. In the present example the bit structures of control words in the zones A differ from the bit structure of information bytes in that the pits are distributed over the available thirty bit positions so that a pit 18 is situated in the sequence number "3" bit position of the first control byte of a control word and a it 16 is situated in the sequence number "12" bit position of the second control byte of such control word. The control words 14 (see FIG. 1a) in the annular zones B differ from the control words in the annular zones A by a control structure in which a pit 19 is situated in the sequence number "5" bit position of the first control byte of a control word and a pit 20 is situated in the sequence number "12" bit position of the second control of such control word. The pits provide synchronization signals during read-out. The control structures can be be used not only for distinguishing between the areas A and B but also for other control purposes. For example, the control words may also comprise a goove 17 for tracking purposes. This is illustrated by means of a longitudinal sectional view of a control structure in FIG. 1a. This structure comprises a relief structure on a substrate 21 carrying a metal layer 23. The metal layer is covered with a transparent coating 22. The depth of the groove 17 and the depth of the pits 19 and 20 are designated D1 and D2 respectively. In practice, the values of D1 and D2 generally correspond to one quarter and one half of the wavelength of the light of the read beam. As a result of the differences in depth the beam is modulated in such a way that the modulations by grooves andpits can be distinguished from each other and from the modulations or by other parts of the surface. The flat portions in the relief, which are situated in the control structures between the groove 17 and the synchronizing pits 19 or 20 may be used for focus control during reading. Moreover, on account of the fact that the control words are situated at equal angular spacings from each other, a clock signal can be generated by means of the control words, which clock signal corresponds to the centres of the bit positions 8. For a more detailed description of the aforementioned controls reference is made to U.S. patent Applicaton No. 760,450 filed on 30 July 1985, which corresponds to published European Patent EP No. 215,556.

FIG. 2 shows an apparatus for reading the information carrier 1. In this Figure the reference numeral 50 represents a drive mechanism of a customary type for rotating the information carrier 1 with a constant angular velocity about the center of rotation 4. A laser 51 generates a read beam 52 which is projected and focussed on the information carrier 1 via a semi-transparent mirror 51a and an objective 53, the beam 52 forming a scanning spot 54 on the information carrier. The read beam 52 is reflected by the information carrier 1, causing the intensity of the read beam 52 to be modulated by the structure of the information carrier at the location of the scanning spot 54. Through the objective 53 and the objective 59 the reflected and modulated read beam 52 is projected onto an optical detector 55 of a customary type, the detector 55 providing a signal to a detection circuit 70 for generating electric signals representing the intensity of the incident read beam 52. The signals generated by the detection circuit 70 can be processed in a manner as described comprehensively in the aforementioned U.S. patent application No. 760,450, to form signals which are suitable for tracking control, focus-control of the beam and for the recovery of the information represented by the information structure. As these control systems fall beyond the scope of the present invention they will not be described herein. The objectives 53 and 59, the semi-transparent mirror 51a, and the detector 55 are incorporated in optical head 57 which can be moved in a direction transverse to the track direction by means of a translating device 58 of a customary type.

Figure 3B:
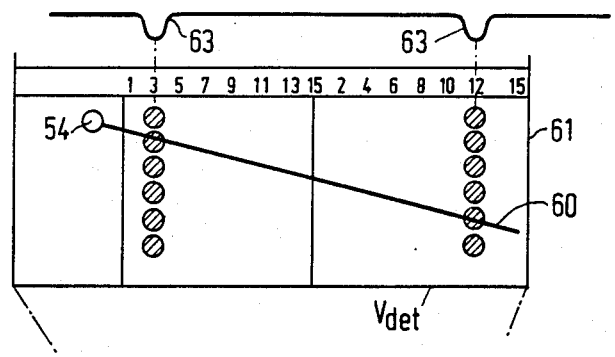
FIGS. 3a thru 3c show an example of a path followed by a scanning spot during a radial displacement in order to clarify the invention.
Figure 3C:
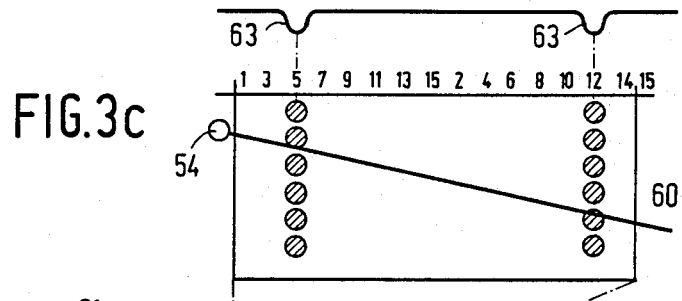
Figure 3A:
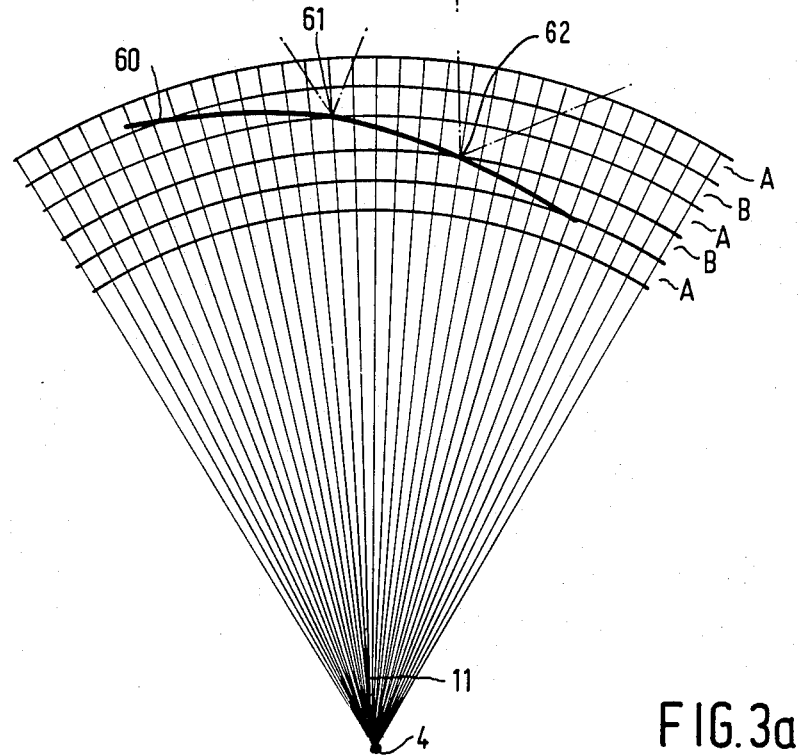

During a such a radial movement the scanning spot follows a path which intersects a number of annular zones A and B, the scanning spot 54 cooperating with the control structures at regular intervals. FIG. 3 shows an example of a path 60 along which the scanning spot 54 intersects the annular zones A and B in the case of a radial displacement of the optical head 57. The intersections of the path 60 with the radii 11 issuing from the center of rotation 4 show the intersections of such path with the control words of such zones. An intersection 61 with the control word in one of the annular zones A is shown to a highly enlarged scale. The signal Vdet which is generated by the detector 55 during the intersection 61 and which represents the intensity of the incident beam is also shown. An intersection 62 with a control word in one of the annular zones B and the signal Vdet produced during this intersection is also shown in FIG. 3. As can be seen in FIG. 3, the detection signal during intersection with the control words in the annular zones A and the detection signal during intersection with the annular zones B differ from each other in that the distances between the peaks 63 in Vdet differ. For intersections with the control words in zones A the distance between the peaks 63 corresponds to a time interval in which the information carrier is rotated through an angle corresponding to 23 bit positions 8, whilst for an intersection with the control words in zones B the distance between the peaks 63 corresponds to a time interval in which the information carrier is rotated through an angle corresponding to 21 bit positions 8. Since the record carrier 1 is driven with a constant angular velocity the intersections with the control words in the zones A and B can be distinguished from one another simply, for example, by time measurements. Since for information bytes only those bit distributions; are permissible in which four pits 12 are distributed over the fifteen bit portions 8 for information byte 9, the likelihood is nil that in the case of a radial displacement of the scanning spot over information bytes situated between control bytes that the detection signal Vdet will have two peaks 63 whose distance corresponds to either 21 or 23 bit positions, so that the components of the detection signal corresponding to the intersections with the information structures can be distinguished effectively from the remainder of the detection signal.

As is apparent from FIG. 3, at least one pair of adjacent control words within each of the zones A and B will be crossed in the case of a radial displacement of the scanning spot, for which during crossing of each of the annular zones A and B the record carrier 1 is rotated through an angle larger than the angle between two successive radii 11. In that case it is possible to detect by the detection signal Vdet a transition from one annular zone to the other simply example by comparing the peaks of the detection signal which occur at the successive intersections with such control words.

Figure 4:
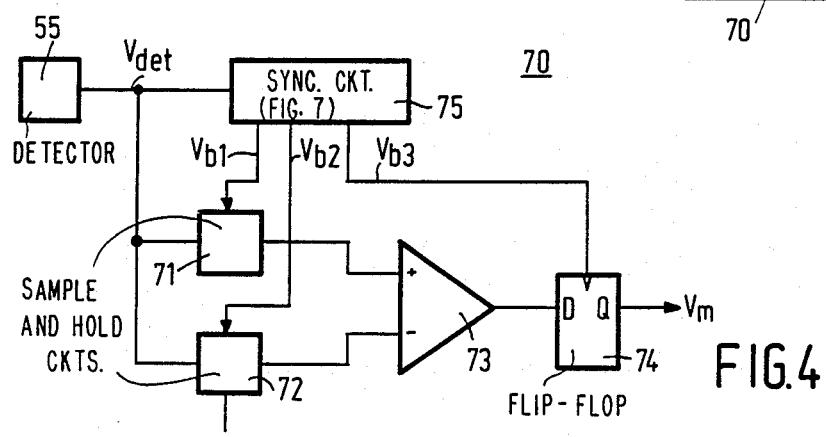
FIG. 4 shows an electrical block diagram of the detection circuit in the apparatus in accordance with the invention.
Figure 5:
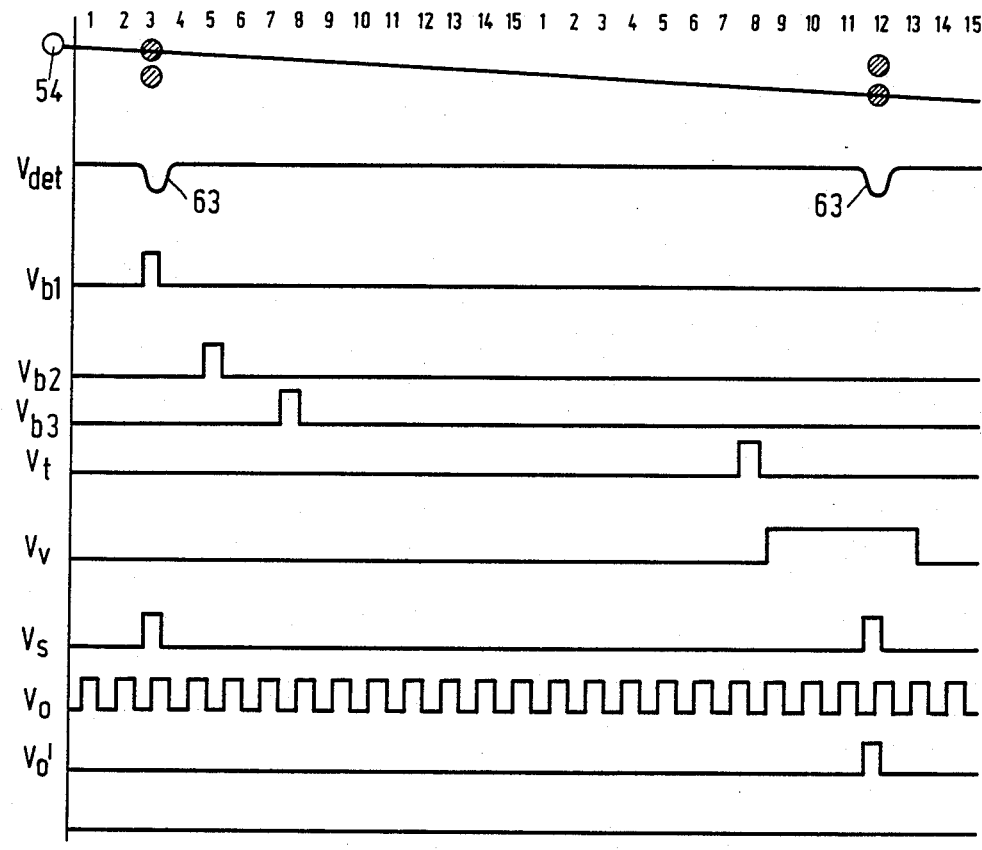
FIG. 5 shows a number of signals generated in the detection circuit and the synchronizing circuit.

FIG. 4 shows an example of a detection circuit 70, which generates a measurement signal Vm which indicates crossings of the boundaries of successive annular zones. The detection circuit 70 comprises a synchronizing circuit 75 (see FIG. 7) which derives control signals Vb1, Vb2 (see FIG. 5) from the detection signal Vdet, which control signals are respectively synchronized with the instants at which the scanning spot 54 respectively scans the bit positions at sequence numbers "3" and "5" of the first control byte of one of the control words. Moreover, briefly after the generation of Vb2 the synchronizing circuit 75 generates a signal Vb3. The control signals Vb1 and Vb2 control a first sample-and-hold circuit 71 and a second sample-and-hold circuit 72 respectively, which is response to the control signals Vb1 and Vb2 respectively sample the detection signal Vdet substantially at the instant at which the center of the scanning spot 54 respectively passes the centers of the bit positions at sequence number "3" and "5" of one of the first control bytes. The outputs of the sample-and-hold circuits 71 and 72 are respectively fed to the positive input and the negative input of a comparator circuit 73. Depending on the result of the comparison, circuit 73 produces a logic "0" or a logic "1" signal on its output. The signal on the output of the comparator circuit 73 is applied to a flip-flop 74, which in response to the control signal Vb3 is set to a state corresponding to the output signal of the comparator circuit 74. The signal Vm on the output of the flip-flop 74 is representative of the state of the flip-flop 74.

The samples taken by the sample-and-hold circuits 71 and 72 respectively represent the reflectivity of the bits in positions 3 and 5 on which the scanning spot 54 is incident in one of the control bytes.

Figure 6:
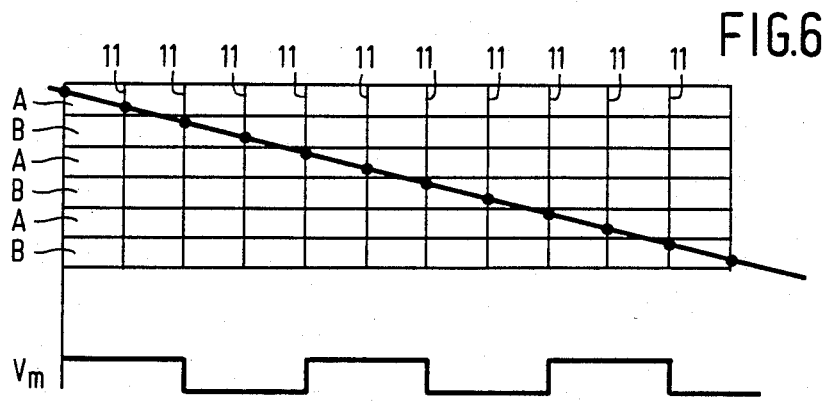
FIG. 6 shows an example of a path followed by a scanning spot during a radial displacement and a measurement signal Vm generated during such a scanning process and, FIG. 7 shows a detailed circuit diagram of the synchronizing circuit and the detection circuit.

In the annular zones A the reflectivities of the bits in sequence position 3 are smaller than the reflectivities of the bits in sequence position 5 of all control words, so that while the scanning spot 54 is situated in one of the annular zones A at the instants at which the control signal Vb3 is generated the output signal of the comparator circuit 73 will be "0". During the passage of on a zone this results in the signal Vm also being "0" from the instant at which the first control word in such zone is scanned by the scanning spot 54. In a similar way it is achieved that during passage of one of the annular zones B, wherein the reflectivities of the bits in positions 3 and 5 are reversed the signal Vm is "1" from the instant at which the first control word in such zone is scanned by the scanning spot 54. Consequently, during a radial displacement of the scanning spot 54, the detection circuit 70 generates a squarewave signal Vm of which each edge indicates a transition between successive annular zones A and B (see FIG. 6).

During a radial displacement of the scanning spot 54 this number of transitions can be counted electronically and compared with a desired number of annular zones to be passed by the scanning spot 54. When the desired number is reached, the radial displacement can be stopped, so that the scanning spot 54 remains addressed to a specific annular zone.

The manner in which the signal Vm is processed electronically and the manner in which the radial displacement of the scanning spot 54 is controlled fall beyond the scope of the present Application and are therefore not described. Once the scanning spot 54 is addressed to a specific annular zone the scanning spot 54 can be addressed to a signal track within the annular zone, for example by means of a digital code contained in the tracks and representing the number of the relevant track to be read, for example in a manner as described in the published Netherlands Patent Application 7212002 (PHN.6508). By means of this address information the actuating device 58 can be controlled in such a way that the scanning spot 54 is addressed to the desired track.

Figure 7:
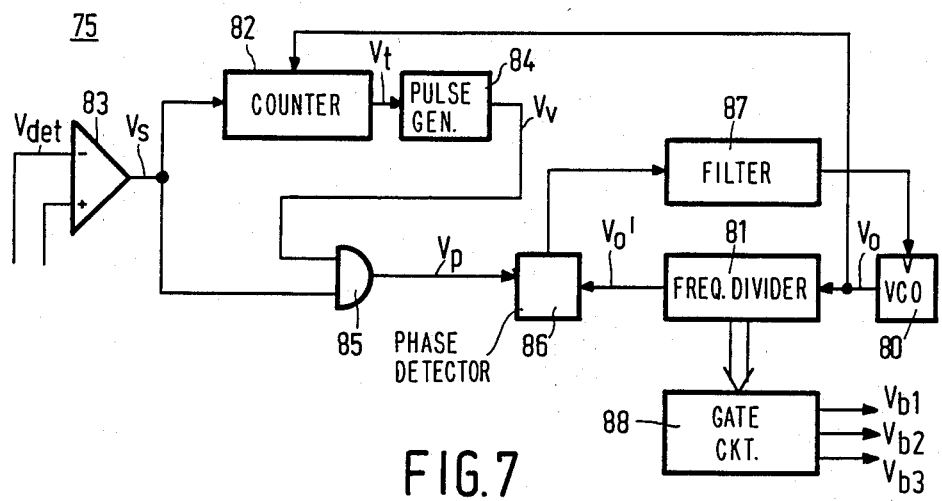

FIG. 7 shows an example of a synchronizing circuit 75. The synchronizing circuit 75 comprises a voltage-controlled oscillator 80 whose phase and frequency are such that pulses Vo are generated which are in synchronism with the instants at which the center of the scanning beam passes the centers of the elementary areas 8 (see FIG. 5). The pulses Vo function as a clock signal for a counter 82. By means of a comparator circuit 83 a pulse-shaped signal Vs (see FIG. 5) is derived from the signal Vdet, which pulse signal serves to reset the counter 82 to zero. It will be evident that the reset signal can also be generated in another way, for example by differentiating the signal Vdet and subsequently generating the reset signal in response to a zero crossing of the differential signal. The counter 82 is constructed in such a way that it supplies a pulse signal Vt (see FIG. 5) at the instant at which the counter has reached the count "20". In response to the signal Vt a pulse generator 84 supplies a pulse signal Vv, whose width substantially corresponds to 5 pulses Vo. The signal Vv and the signal Vs are applied respectively to a first input and a second input of a two-input AND-gate 85.

By means of the counter 82 each meeting of the scanning spot 82 with control words is detected. As already described, the control words differ from the information bytes in that the distance between the peaks 63 in the detection signal Vdet produced by control words is larger, then when information bytes are scanned. Since the counter 82 is set to zero upon every pulse of the signal Vs the number of pulses counted by the counter 82 represents the time which has elapsed from the instant at which the last peak 63 in the detection signal Vdet has appeared. If this time exceeds a specific value, which indicates that a control word was scanned (in the present example this is the count "20"), the counter 82 generates the signal Vt, as a result of which a pulse Vv is generated. The count for which the signal Vt is supplied and the width of the pulse Vv are selected in such a way that the instant at which one of the synchronizing pits 16 or 20 is scanned always falls within a time window defined by the pulse Vv, so that on the output of the AND-gate 85 pulses are generated only at instants which correspond to the instants at which the scanning spot 54 meets synchronizing pits 16 or 20.

The output signal of the AND-gate 85 is applied to one of the two inputs of a phase detector 86. A signal Vo' is applied to the other input of the phase detector 86, which signal is obtained by means of a frequency divider 81 with a divisor equal to the number of elementary areas corresponding to the angle between successive synchronizing pits 16 or 20. The voltage-controlled oscillator 80, the frequency divider 81, the phase detector 86 and a loop filter 87 together constitute a phase-locked loop by means of which the aforementioned phase and frequency of the signal Vo are obtained for which the pulses Vo are in synchronism with the instants at which the center of the scanning spot 54 passes the centers of the bit position areas 8. In the present example the frequency divider 81 is formed by a counter. By means of a gate circuit 88 of the customary type the pulse signals Vb1, Vb2 and Vb3 are derived from the count of the frequency divider 81.

In the present embodiment the control words differ from the information bytes by the distance between bit positions having pits therein. Depending on in which of the two types of annular zones the control structures are situated this distance corresponds to "21" or "23" bit positions. It is evident that the control words may differ from the information bytes by other distances, for example distances which do not correspond to a multiplicity of bit positions but, for example, to 1½ or ¼ times of the length of a bit position. Further, it is for example possible to identify the control words by a number of successive pits larger than the maximum permissible number of successive pits in the information bytes. It will also be appreciated that in fact any control word structures which can be distinguished from each othe in zones A and B may be used, provided that these words are radially aligned with each other and vary mainly in the tangential direction, so that when a group of adjacent control words is crossed the modulation of the scanning beam is substantially independent of when the scanning spot intersects the control words. For example, instead of control words constituted by rows of pits in a radial direction, it is also possible to employ control words in which the pits overlap one another and thus constitute elongate grooves which extend in a radial direction. Moreover, it is not necessary that the pits in the control words be situated in the centers of the tracks. For example, it is also possible within the control words to arrange that a pit is to the left of the center and a pit is to the right of the center. The pits can then also be used for tracking control, so that the groove in the control word may be dispensed with.

As described above the control words are situated on a set of radii issuing from the center of rotation and having equal angular spacings. However, other arrangements are also possible. It is adequate to divide the groups of adjacent distinguishable control words over the annular zones in such a way that at least one group of control words is intersected at a given maximum radial velocity of the scanning spot and a given speed of rotation of the information carrier in each annular zone. Another possibility is to allow a radial displacement over only a limited number of tracks and to select such a distribution of the groups of adjacent control words that the permissible paths intersect at least one group of control words within each annular zone. This is possible, for example, by only allowing a radial displacement of the scanning spot within a limited number of record-carrier sectors provided with control words.

What is claimed is:

1. An optical record carrier having substantially concentric tracks thereon for storing information in successive bit positions on each track, successive groups of such tracks being distinguishable from each other so as to form a succession of first and second alternate zones on said carrier, said tracks being readable by an optical scanning beam; said record carrier being characterized in that:

each of said tracks comprises a plurality of control bytes, each control byte including the same number of bit positions on such tracks, the control bytes on successive tracks being radially aligned with each other; and each pair of radially aligned control bytes on successive pairs of tracks in said first zone constitutes a first control word, each pair of radially aligned control bytes on successive pairs of tracks in said second zone constitute a second control word, and said first and second control words have structures which are distinguishable from each other when such control words are read by said scanning beam;

whereby when said scanning beam crosses from any of said zones into the succeeding zone the structure of the control word read by said scanning beam will change, thereby providing an indication that such a zone crossing has occurred.

2. An optical record carrier as claimed in claim 1, characterized in that each of said tracks further comprises information bytes located between the control bytes thereon.

3. An optical record carrier as claimed in claim 1 or 2, characterized in that successive control bytes on each track are at radial positions which are at equal angular spacings from each other.

4. An optical record carrier as claimed in claim 3, characterized in that the structural difference between said first and second control words is that enumerated bit positions of each of said first control words have bits therein of opposite values form the bits in such enumerated bit positions of each of said second control words.

5. An apparatus for reading a record carrier having substantially concentric tracks thereon for storing information in successive bit positions on each track, successive groups of such tracks being distinguishable by the structures of control words on such tracks so as to form a succession of first and second alternate zones on said record carrier, such apparatus comprising means for producing a read beam of radiation for scanning such tracks and a detector for converting the read beam into electrical detection signals which are modulated in accordance with the information on said tracks; characterized in that said apparatus comprises a detection circuit coupled to said detector for comparing the detection signals produced from scanning of successive control words, and which produces a measurement signal ($V_m$) when such comparison indicates that the structure of a control word then being scanned differs from the structure of the previously scanned control word; said measurement signal signifying that the scanning beam has crossed from one of said zones to another of said zones.

6. An apparatus as claimed in claim 5, characterized in that said detection circuit comprises:

a synchronizing circuit for deriving from said detection signal first and second control signals respectively coincident with scanning of first and second enumerated bit positions in each of said control words;

a first sample-and-hold circuit responsive to said first control signal for sampling and holding the value of the detection signal produced upon scanning of any of said first bit positions;

a second sample-and-hold circuit responsive to said second control signal for sampling and holding the value of the detection signal produced upon scanning of any of said second bit positions; and a comparator circuit coupled to said first and second sample-and-hold circuits for comparing said first and second samples of said detection signal and generating said measurement signal when such samples differ from each other.

7. An optical record carrier having substantially concentric tracks thereon for storing information in successive bit positions on each track, successive groups of such tracks being distinguishable from each other so as to form a succession of first and second alternate zones on said carrier, said tracks being readable by an optical scanning beam; said record carrier being characterized in that:

each of said tracks comprises a plurality of control bytes, each control byte including the same number of bit positions on such track, the control bytes on successive tracks being radially aligned with each other; and the control bytes of all tracks in said first zone have a first bit pattern and the control bytes of the tracks in the second zone have a second bit pattern different from said first bit pattern;

whereby when said scanning beam crosses from any of said zones into the succeeding zone the structure of the control bytes ready by said scanning beam will change, thereby providing an indication that such a zone crossing has occurred.

* * * * *